United States Patent [19]

Kämmler et al.

[11] Patent Number: 5,535,958
[45] Date of Patent: Jul. 16, 1996

[54] TECHNICAL DEVICE WITH OUTSERT MOLDED PARTS HAVING IMPROVED BEARING QUALITIES

[75] Inventors: Georg Kämmler, Berlin, Germany; Herbert Platzer, Eindhoven, Netherlands

[73] Assignee: U.S. Philips Corporation, New York, N.Y.

[21] Appl. No.: 139,491

[22] Filed: Oct. 19, 1993

[30] Foreign Application Priority Data

Oct. 27, 1992 [DE] Germany ........................ 42 36 179.6

[51] Int. Cl.⁶ .............................................. B29C 53/84
[52] U.S. Cl. .......................................... 242/358; 264/242
[58] Field of Search ................................ 242/335, 338, 242/358; 264/242, 267

[56] References Cited

U.S. PATENT DOCUMENTS

| | | | |
|---|---|---|---|
| 4,542,431 | 9/1985 | Ida | 360/137 |
| 4,772,965 | 9/1988 | Kato et al. | 360/71 |
| 5,126,184 | 6/1992 | Yabe et al. | 428/131 |
| 5,148,350 | 9/1992 | Chan et al. | 361/386 |
| 5,161,239 | 11/1992 | Hodulik et al. | 360/137 |
| 5,354,531 | 10/1994 | Gumbert | 264/242 |

*Primary Examiner*—John P. Darling
*Attorney, Agent, or Firm*—Brian J. Wieghaus

[57] ABSTRACT

A technical device, such as an electromechanical deck for moving information carriers, includes a plastics function part molded into a deck plate by outsert-molding. The function part includes a bridge element, which traverses a hole in the deck plate, and retaining elements, which are situated at the deck plate surfaces and are interconnected by the bridge element, the plastics of said part being subject to shrinkage after injection-molding. The mobility of the function part as a rotatable or slidable part is obtained automatically despite shrinkage of the plastics part by positioning the retaining elements at each end of the bridge element so that they do not overlap, when viewed in the axial direction of the bridge, with a retaining element at the opposite end of the bridge.

24 Claims, 4 Drawing Sheets

TECHNICAL DEVICE WITH OUTSERT MOLDED PARTS HAVING IMPROVED BEARING QUALITIES

BACKGROUND OF THE INVENTION

The invention relates to a technical device, particularly an electromechanical deck for moving information carriers, the device comprising at least one plastics function part formed on a deck plate, which part has been moulded onto the deck plate by outsert-moulding and comprises at least one bridge element, which traverses a hole in the deck plate, and retaining elements, which are situated at the deck plate surfaces and are interconnected by the bridge element, the plastics of said part being subject to shrinkage after injection-moulding.

Technical devices comprising metal supporting plates having moulded-on plastics parts are known. The technique of manufacturing such metal supporting plates is known as outsert-moulding. The function parts formed on the metal supporting plate are intended for a variety of purposes, such as retaining, supporting or guiding further function pans. The moulded-on pans and the metal supporting plate are always joined in that moulded plastics retaining elements formed at opposite sides of a hole in the metal plate are interconnected by a bridge element traversing the hole. The length reduction of the bridge element as a result of the inevitable shrinkage of the plastics after moulding causes the retaining elements to be drawn towards both plate surfaces. This results in a comparatively tight fit which just allows a rotation into a desired position but which is not comparable to a bearing construction whose parts in operation constantly perform a movement, for example a rotation or translation.

From DE 39 11 746 C2 it is known to provide a mobility similar to that of a rotary or sliding bearing by deformation of the moulded-on material after the moulding process.

From JP 57-197139 A it is known to interpose between the mould cavity for a retaining element of the kind described and the associated plate surface a spacer which should be retained very carefully and reliably during the moulding process. After moulding, this spacer is removed to provide the mobility of the moulded-on pan. The insertion, retention and subsequent removal of the spacer render the process too laborious for mass production.

It has also been proposed to provide a different shrinkage force, and thus a greater or smaller mobility at the corresponding bearing locations, by varying the thickness of the retaining elements. However, the resulting mobility is inadequate for the construction of lever or toothed-wheel bearings. In addition, the retaining elements around the hole in the metal plate cannot be made arbitrarily thin because in such cases it is no longer guaranteed that the hole with the bridge element and the retaining elements connected thereto is filled correctly during injection moulding. Moreover, the mechanical strength of a connection of function parts to very thin retaining elements is inadequate.

SUMMARY OF THE INVENTION

It is an object of the invention to construct function parts, formed on a deck plate in a deck of a technical device during moulding by means of an outsert-moulding technique, in such a manner that they provide the rotation or translation capability required in operation without a subsequent finishing operation being necessary.

According to the invention, this object is achieved in that the mobility of the function part as a rotatable or slidable part is obtained automatically through shrinkage of the plastics function part by the following construction: the retaining elements are connected to the axial ends of the bridge element only in circumferential zones and are offset relative to one another in such a manner that when the circumferential zones of bridge a element overlap only one bridge end at one plate surface carries a retaining element and the other bridge end at the other plate surface situated in the area of overlap is free of retaining elements.

When the function part is thus constructed within the scope of the moulding process, the mobility of this part after shrinkage is such that it is freely movable to the required extent during operation of the device. Clamping as a result of shrinkage in the axial direction is not possible.

In a further embodiment of the invention, there is only one retaining element at each of the plate surfaces and the retaining elements are disposed diametrically opposite one another. The circumferential zones which remain free are then so large that the required mobility is assured.

In a further embodiment of the invention, the wall thickness of the bridge element between its inner wall and its outer wall is dimensioned in such a manner that a desired clearance between the inner wall of the hole in the deck plate and the outer wall of the bridge element is obtained as a result of shrinkage of the bridge element after moulding, and preferably the clearance is between 50 and 100 μm.

During shrinkage, with the resulting reduction of the length of the bridge element, the function pan with its retaining elements is liable cant in the hole in the metal plate. Depending on the purpose for which the function part is used this canting is not problematic because it is extremely small.

However, if the slight degree of canting of the bearing is considered to be undesirable this can be mitigated by means of a further embodiment of the invention in that a supporting arm is provided on at least one of the retaining elements at the associated plate surface, which arm is disposed around and spaced from the hole, lies against said plate surface, and extends into the area of overlap with the retaining element at the other plate surface. Such a supporting arm can be improved by means of a further embodiment of the invention in that the supporting arm is extended to form a supporting loop whose ends are connected to the retaining element and which surrounds and is spaced from the hole, starting from the retaining element.

The invention is suitable for both rotary and sliding constructions, an essential requirement being merely that those circumferential zones of the bridge element at the plate surfaces which are free of retaining elements are large enough.

BRIEF DESCRIPTION OF THE DRAWINGS

The invention will now be described in more detail with reference to the drawings. In the drawings:

FIG. 1 shows the deck plate 2 of a device 1, for example a magnetic-tape-cassette deck of a car radio, on which deck plate plastics function parts 3 and 5 have been mounted by an outsert-moulding technique, for example, for supporting a circuit board 4 or a motor 6. The plastics is preferably a semi-crystalline thermoplastic whose shrinkage without loading material is of the order of magnitude of 1% to 3%. The shrinkage can be reduced even further by the addition of loading materials. This has the advantage that the bridge element width can be increased. Moreover, canting is reduced. A head-mounting plate 8 is arranged on the deck plate 2 so as to be pivotable about an axis 7 and has limbs 9 and 11 at corner areas 12 and 13. The base 8a of the head-mounting plate carries a magnetic head 16 and pressure rollers 19 cooperating with capstans 18 via supports 17.

Figure 1:
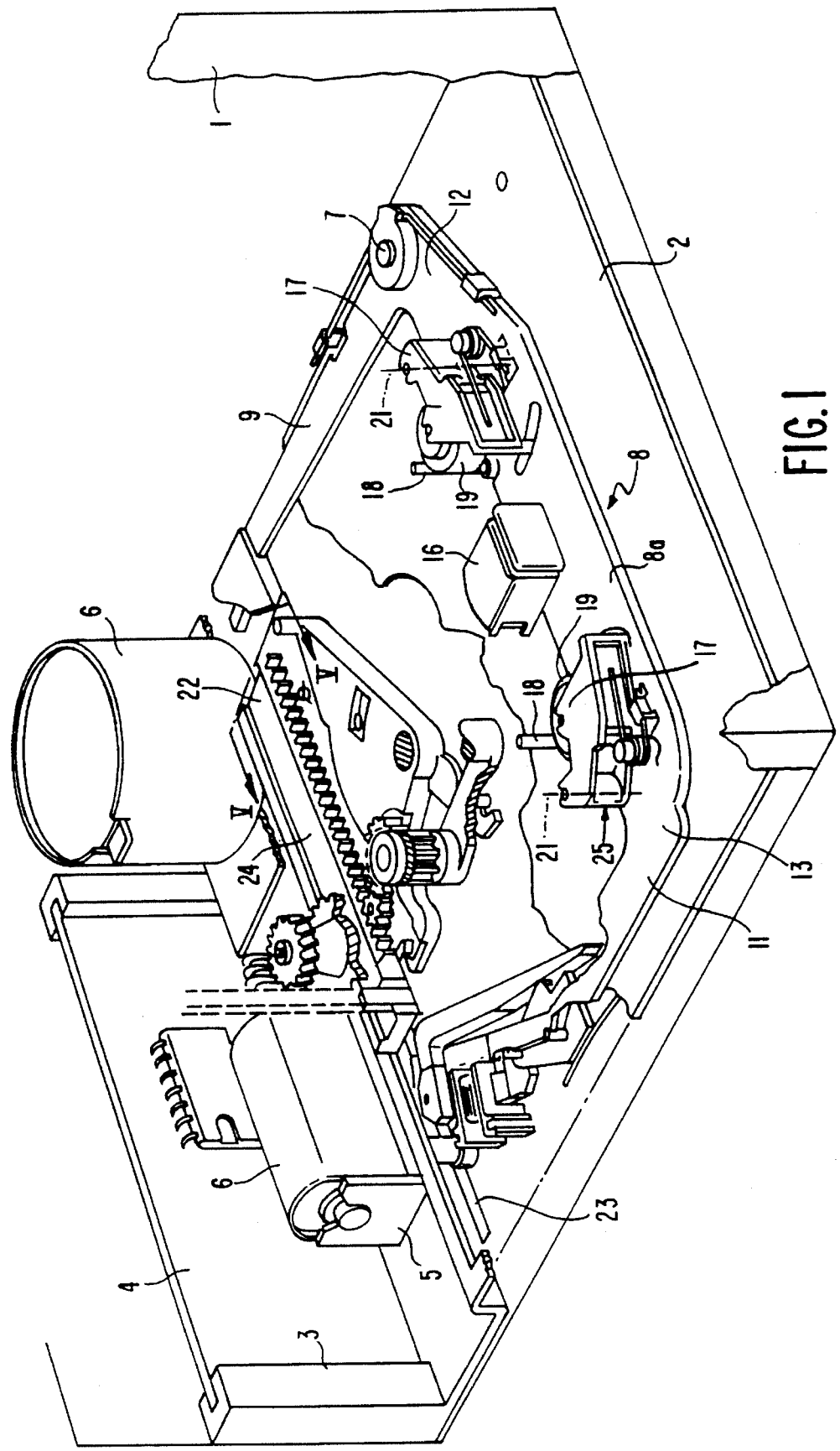
FIG. 1 diagrammatically shows a device, particularly a deck for an information carrier in the form of a tape, which device forms part of a car radio.

The supports 17 of the pressure rollers 19 are pivotable about axes 21. The construction used for this purpose is described comprehensively with reference to FIGS. 2 to 4. The deck plate 2 has a slot 23 in which a slide 24 is movable. This construction for supporting this slide 24 is described in detail in FIG. 5.

Figure 2:
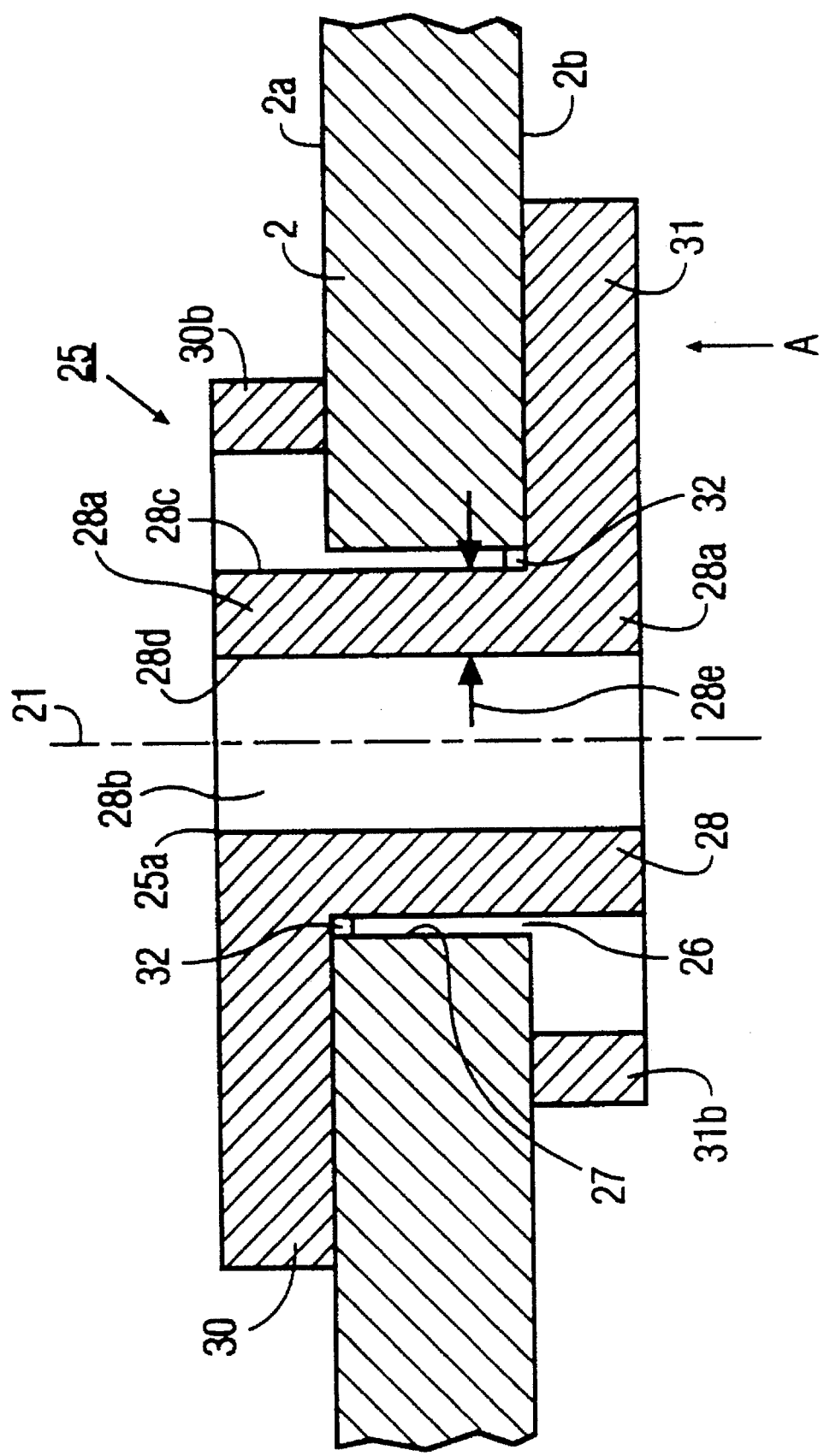
FIG. 2 is a sectional view of a metal deck plate with a function part moulded on by outsert-moulding, which function part is rotatable relative to this deck plate after it has been moulded onto this plate.

FIG. 2 is a sectional view showing a rotary bearing 25 of the support 17 with the axis 21. The stationary pan of the bearing 25 is formed by the metal deck plate 2 with a hole 26. The rotatable pan of the bearing 25 is formed by an injection-moulded plastics function pan 25a. The hole 26 of the rotary bearing 25 is circular or slotted and has an inner wall 27. The metal deck plate 2 has undergone such an outsert-moulding process that a bridge element 28 of the function pan 25a extends through the hole 26. At the plate surfaces 2a and 2b, retaining elements 30 and 31 of the function part 25a are connected to the axial ends 28a of the bridge element. A retaining element 30 is situated at the plate surface 2a and a retaining element 31 is situated at the plate surface 2b. The retaining elements 30, 31 are connected only to circumferential zones 30a and 31a of the bridge element 28, i.e. of the axial bridge ends 28a, and are offset relative to one another in such a manner that when the circumferential zones 30a at the upper and the lower side and the circumferential zones 31a at the upper and the lower side overlap in a plan view in an axially parallel direction only one bridge end 28a at one plate surface 2a or 2b carries a retaining element and the circumferential zone at the other plate surface 2b or 2a is free of retaining elements 30, 31. This is clearly shown in FIG. 3, which is a plan view as indicated by an arrow A in FIG. 2. There is a sector x in which the bridge element 28 is completely free of retaining elements 30 or 31.

Owing to the absence of retaining elements along a circumferential zone, and the mutually offset arrangement of the retaining elements at the location of the circumferential zones 30a, 31a which overlap in an axially parallel direction, freedom of movement is obtained after shrinkage of the bearing 25 carrying the support 17 without a subsequent operation being required. The freedom of movement is such that it is available right from the start and throughout the life of the deck.

Figure 3:
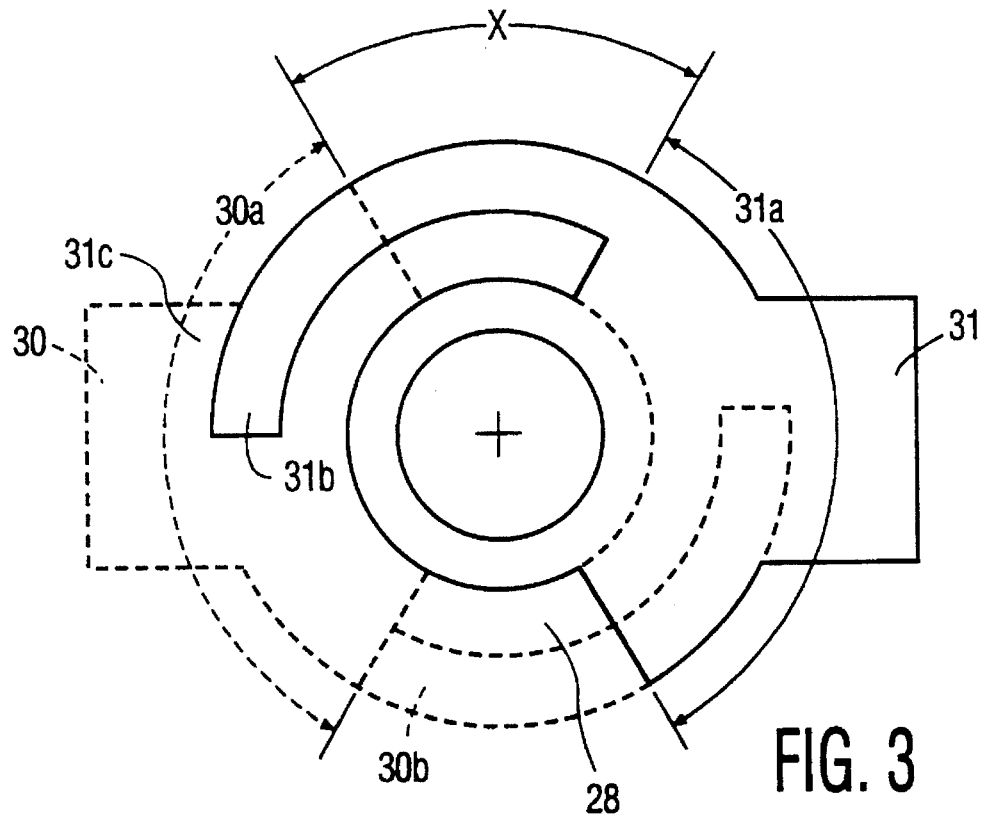
FIG. 3 is a plan view of the function part shown in FIG. 2.
Figure 4:
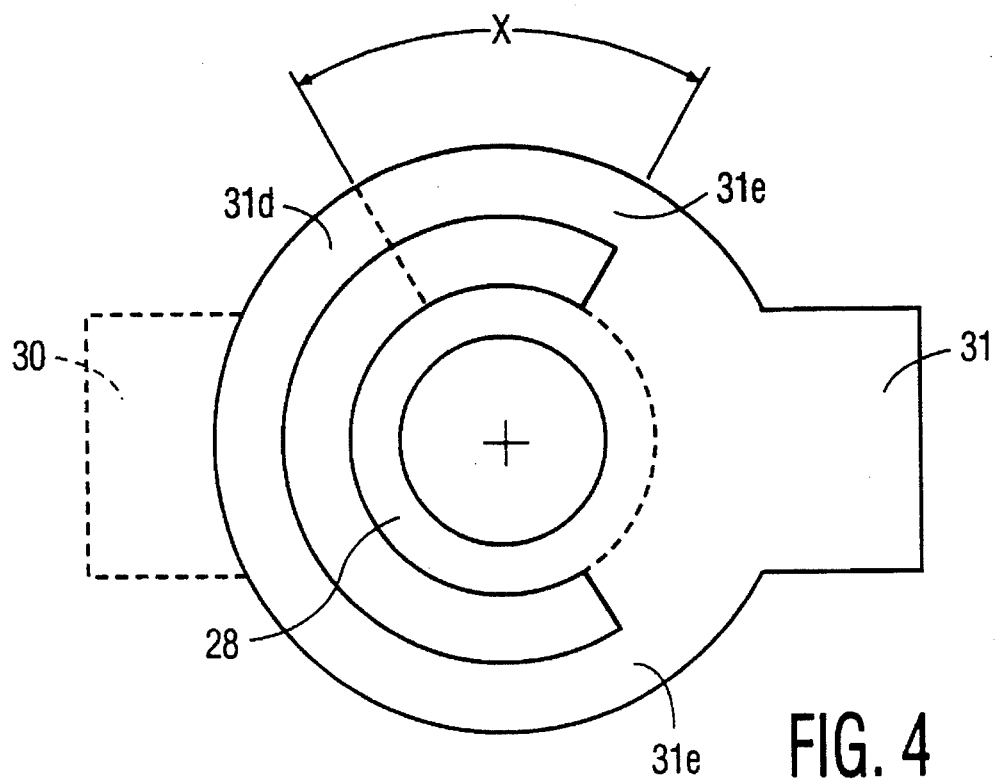
FIG. 4 shows the function part of FIG. 2 with a modified supporting arm.

In FIGS. 2 to 4, the retaining elements 30 and 31 at the one plate surface 2a and at the other plate surface 2b are disposed diametrically opposite one another. When the circumferential zones 30a and 31a are made considerably shorter it is also possible, instead of two retaining elements 30 and 31, to use four retaining elements disposed alternately at the one plate surface 2a, 2b and at the other plate surface 2b, 2a.

The bridge element may be solid. However, for a controlled shrinkage it is advantageous if the bridge element 28 is tubular with a bore 28b. Thus, the bridge element 28 has an outer wall 28c which during injection-moulding has the same diameter as the inner wall 27 of the hole 26 in the metal plate 2. The wall thickness 28e of the tubular bridge element 28 between its inner wall 28d and its outer wall 28c is dimensioned in such a manner that after moulding the required clearance between the inner wall 27 of the hole 26 in the deck plate 2 and the outer wall 28c of the bridge element 28 is obtained as a result of the shrinkage of the bridge element. The clearance is preferably between 50 and 100 μm.

The shrinkage of the bridge element 28 in an axial direction may give rise to a slight canting of the rotatable function part 25a at points 32. In order to mitigate this, the retaining elements 30 and/or 31, as is shown in FIGS. 2 and 3, are provided with supporting arms 30b, 31b. The supporting arm 31b is disposed around and spaced from the hole 26, lies against the plate surface 2b, and extends into the area 31c overlying the retaining element 30. If present, a supporting arm 30b is similarly disposed around and spaced from the hole 26, lies against the plate surface 2a and extends into the area opposite the retaining element 31 at the other plate surface 2b. This mitigates canting of the rotatable bearing pan 28, 30, 31 without its rotatability being impaired.

FIG. 4 shows a modified embodiment in which the supporting arm 31b has been extended to form a supporting loop 31d whose ends 31e are connected to the retaining element 31 and which surrounds and is spaced from the hole 26, starting from the retaining element 31.

Figure 6:
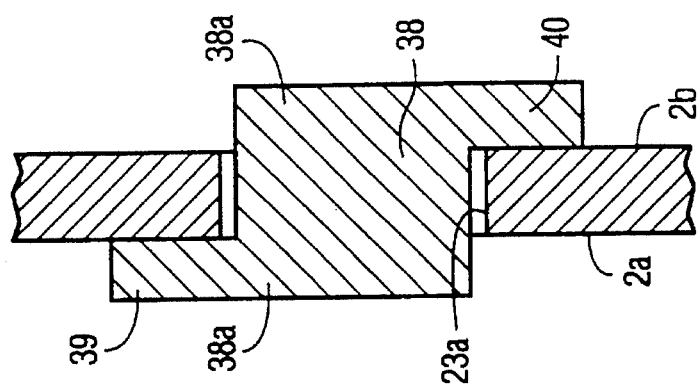
FIG. 6 shows the function part of FIG. 5 in a sectional view taken on the line VI—VI in FIG. 5.
Figure 5:
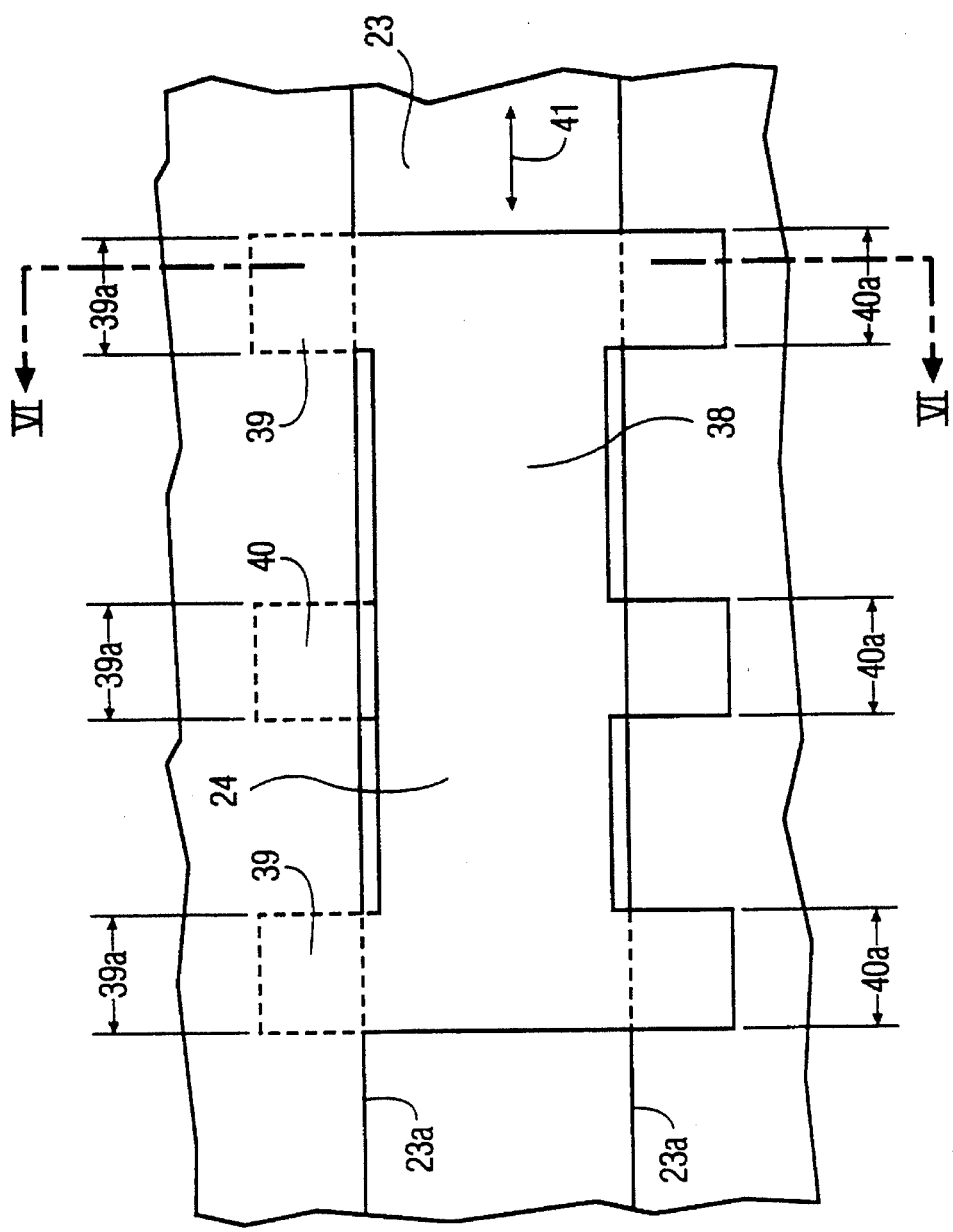
FIG. 5 shows the function part constructed as a sliding part which is slidable relative to the deck plate after it has been moulded onto this plate.

Whereas FIGS. 2 to 4 show rotary bearings 25, FIG. 5 shows a sliding construction for a slide 24. The slide 24 forms a slidable function part. The stationary part of the sliding construction is the slot 23 in the deck plate 2, in which slot the slide 24 is movable in the longitudinal direction. FIG. 6 shows the slide arrangement of FIG. 5 in a sectional view taken on the line IV—IV in FIG. 5. In analogy with the rotatable construction shown in FIGS. 2 to 4, the slide 24 comprises a bridge element 38, which is now strip-shaped, and retaining elements 39 and 40. The retaining elements 39 overly the plate surface 2a at the slot edges 23a in a direction perpendicular to the sliding direction 41 and the retaining elements 40 overly the plate surface 2b also in a direction perpendicular to the sliding direction. The retaining elements 39 and 40 do not overlap one another because the circumferential zones 39a and 40a in which the retaining elements 39, 40 are connected to the bridge element 38 extend only at the one or at the other slot edge 23a perpendicularly to the slide 24. In this way the slide 24 will not jam in the slot 23 in a direction perpendicular to the slot after shrinkage of the bridge element 38.

We claim:

1. A technical device, comprising a deck plate with a hole therein and opposing deck plate surfaces, and a plastics function part moulded onto the deck plate by outsert-moulding, the function part comprising a bridge element, which traverses the hole in the deck plate, and retaining elements, which are situated at the deck plate surfaces and are interconnected by the bridge element (28, 38), the plastics of said part being subject to shrinkage after moulding, characterized in that:

the retaining elements connected to the bridge element define respective circumferential zones of the bridge element and none of said circumferential zones circumferentially overlap any other of said circumferential zones.

2. A technical device as claimed in claim 1, characterized in that the function part includes only one retaining element at each of the plate surfaces and the retaining elements are disposed diametrically opposite one another.

3. A technical device as claimed in claim 2, characterized in that the deck plate hole has an inner wall, the bridge element has an inner wall and an outer wall defining a wall thickness, and the wall thickness is dimensioned in such a manner that a desired clearance between the inner wall of the hole in the deck plate and the outer wall of the bridge element is obtained as a result of shrinkage of the bridge element after moulding.

4. A technical device as claimed in claim 3, characterized in that the clearance is between 50 and 100 μm.

5. A technical device as claimed in claim 4, characterized in that a said retaining element includes a supporting arm at the adjacent plate surface, which arm is disposed around and spaced from the hole in the deck plate, lies against said adjacent plate surface, and extends into the respective circumferential zone of a retaining element at the other plate surface.

6. A technical device as claimed in claim 5, characterized in that the supporting arm forms a supporting loop (i) with opposing ends each connected to the said retaining element and (ii) which surrounds and is spaced from the hole in said deck plate.

7. A technical device as claimed in claim 3, characterized in that a said retaining element includes a supporting arm at the adjacent plate surface, which arm is disposed around and spaced from the hole in the deck plate, lies against said adjacent plate surface, and extends into the respective circumferential zone of a retaining element at the other plate surface.

8. A technical device as claimed in claim 7, characterized in that the supporting arm forms a supporting loop (i) with opposing ends each connected to the said retaining element and (ii) which surrounds and is spaced from the hole in said deck plate.

9. A technical device as claimed in claim 2, characterized in that a retaining element includes a supporting arm at the adjacent plate surface, which arm is disposed around and spaced from the hole in the deck plate, lies against said adjacent plate surface, and extends into the respective circumferential zone of a retaining element at the other plate surface.

10. A technical device as claimed in claim 9, characterized in that the supporting arm forms a supporting loop (i) with opposing ends each connected to the said retaining element and (ii) which surrounds and is spaced from the hole in the deck plate.

11. A technical device as claimed in claim 1, characterized in that a retaining element includes a supporting arm at the adjacent plate surface, which arm is disposed around and spaced from the hole in the deck plate, lies against said adjacent plate surface, and extends into the respective circumferential zone of a retaining element at the other plate surface.

12. A technical device as claimed in claim 11, characterized in that the supporting arm forms a supporting loop (i) with opposing ends each connected to the retaining element and (ii) which surrounds and is spaced from the hole in the deck plate.

13. A technical device as claimed in claim 1, characterized in that the the deck plate hole has an inner wall, the bridge element has an inner wall and an outer wall defining a wall thickness, and the wall thickness is dimensioned in such a manner that a desired clearance between the inner wall of the hole in the deck plate and the outer wall of the bridge element is obtained as a result of shrinkage of the bridge element after molding.

14. A technical device as claimed in claim 13, characterized in that the clearance is between 50 and 100 μm.

15. A technical device as claimed in claim 14, characterized in that a retaining element includes a supporting arm at the adjacent plate surface, which arm is disposed around and spaced from the hole in the deck plate, lies against said adjacent plate surface, and extends into the respective circumferential zone of a retaining element at the other plate surface.

16. A technical device as claimed in claim 15, characterized in that the supporting arm forms a supporting loop (i) with opposing ends each connected to the retaining element and (ii) which surrounds and is spaced from the hole in the deck plate.

17. A technical device as claimed in claim 13, characterized in that a retaining element includes a supporting arm at the adjacent plate surface, which arm is disposed around and spaced from the hole in the deck plate, lies against said adjacent plate surface, and extends into the respective circumferential zone of a retaining element at the other plate surface.

18. A technical device as claimed in claim 17, characterized in that the supporting arm forms a supporting loop (i) with opposing ends each connected to the retaining element and (ii) which surrounds and is spaced from the hole in the deck plate.

19. An apparatus, comprising:

a plate with a first and second opposing surfaces, said plate including an aperture extending between the opposing surfaces; and a molded part outsert molded in said aperture, said part being subject to shrinkage after molding, said part including (i) a bridge portion having a circumference and extending in an axial direction through said aperture in said plate between the opposing surfaces, and (ii) a retaining portion, at each of said opposing plate surfaces, joined with said bridge portion and overlying the respective plate surface, each of said retaining portions being joined at said bridge portion for only part of the circumference of said bridge portion, and each retaining portion being arranged such that, when viewed in the axial direction of said bridge portion, said each retaining portion does not overly the circumferential part joined at said bridge portion of any retaining portion at the opposing plate surface.

20. An apparatus according to claim 19, wherein the sum of the circumferential parts of all the retaining portions joined at said bridge portion at a plate surface is less than the circumference of the bridge portion.

21. An apparatus according to claim 19, further comprising a supporting arm cantilevered from a said retaining portion, spaced from said bridge portion, and engaging the respective plate surface.

22. An apparatus according to claim 19, further comprising a supporting portion joined to a said retaining portion and spaced from said bridge portion.

23. An apparatus according to claim 22, wherein said supporting portion is annular, has opposing ends joined to said retaining portion, and extends fully over the part of the circumference of the bridge portion not covered by said retaining portion.

24. An apparatus according to claim 23, wherein said molded part includes a plurality of said retaining portions at a said plate surface and said supporting portion extends between each of said retaining portions.

\* \* \* \* \*